3,639,541
ESTER-CONTAINING POLYOLS HAVING HALO-
GEN AND PHOSPHORUS ATOMS
Arthur L. Austin, Southgate, Louis C. Pizzini, Trenton,
and William W. Levis, Jr., Wyandotte, Mich., assignors
to BASF Wyandotte Corporation, Wyandotte, Mich.
No Drawing. Filed May 13, 1968, Ser. No. 728,813
Int. Cl. C07f 9/08; C08g 22/44
U.S. Cl. 260—952
8 Claims

ABSTRACT OF THE DISCLOSURE

Ester-containing polyols are prepared by the reaction of (a) polyhydroxyl-containing compounds with (b) acids or oxides of phosphorus, (c) halogen-containing organic acid anhydrides, and (d) alkylene oxides. The polyols are particularly useful in the preparation of flame-retardant polyurethane foams.

---

The present invention relates to ester-containing polyols and to the use thereof in the preparation of urethane compositions. More particularly, the invention relates to ester-containing polyols having a combination of halogen and phosphorus atoms chemically bound therein and to the use thereof in the preparation of flame-retardant polyurethane foams.

It has become increasingly important to impart flame-resistant properties to polyurethane plastics. This is particularly true where cellular polyurethanes are used, for example, as insulation, and to prevent the risk of fire in the daily use of other items. Numerous methods are known for imparting flame-resistant properties to polyurethane plastics. For example, in the production of the cellular polyurethanes one may use halogenated compounds or derivatives of acids of phosphorus as the active hydrogen-containing component and thus impart flame resistance. It is also possible to use compounds of antimony or boron. Moreover, non-reactive phosphorus or halogen-containing compounds may be used as additives for this purpose. All of these substances are capable of imparting some flame-resistant properties to polyurethane foam plastics. The disadvantage associated with all of these substances in that the use of increasing quantities leads to a serious impairment of the mechanical and physical properties of the cellular polyurethanes. Moreover, as the quantity of the flame-resisting agents is increased, the problem of mixing the component containing the flame-resisting agent with the balance of the components leading to the production of a cellular polyurethane plastic is increased.

It is an object of the present invention to provide novel ester-containing polyols which impart flame-resistant properties to polyurethane compositions and which are substantially devoid of the foregoing disadvantages. It is a further object of the invention to provide polyols containing both halogen and phosphorus atoms. Still another object of the present invention is to provide polyurethane compositions useful in the preparation of foams, adhesives, binders, laminates, and coatings. These and other objects of the present invention will be apparant from the specification and examples which follow.

The above objects are accomplished in accordance with the present invention by providing novel ester-containing polyols having both halogen and phosphorus atoms chemically bound therein and which are of relatively low viscosity. The novel ester-containing polyols of the present invention are prepared by the reaction of (a) polyhydroxyl-containing compounds with (b) acids or oxides of phosphorus, (c) halogen-containing organic acid anhydrides, and (d) alkylene oxides.

As mentioned above, there are four essential reactants employed in the preparation of the ester-containing polyols of the present invention, namely, a polyhydroxyl-containing compound, an acid or oxide of phosphorus, a halogen-containing organic acid anhydride, and an alkylene oxide. Alkylene oxides which may be employed in the preparation of the ester-containing polyols of the present invention include ethylene oxide, propylene oxide, the isomeric normal butylene oxides, hexylene oxide, octylene oxide, dodecene oxide, methoxy and other alkoxy propylene oxides, styrene oxide, and cyclohexene oxide. Halogenated alkylene oxides may also be used, such as epichlorohydrin, epiiodohydrin, epibromohydrin, 3,3-dichloropropylene oxide, 3-chloro-1,2-epoxypropane, 3-chloro-1,2-epoxybutane, 1-chloro-2,3-epoxybutane, 3,4-dichloro - 1,2-epoxybutane, 1,4-dichloro-2,3-epoxybutane, 1-chloro-2,3-epoxybutane, and 3,3,3-trichloropropylene oxide. Mixtures of any of the above alkylene oxides may also be employed.

Polyhydroxyl-containing compounds which may be employed in the preparation of the ester-containing polyols of the present invention are well known in the art. They are often prepared by the catalytic condensation of an alkylene oxide or mixture of alkylene oxides either simultaneously or sequentially with an organic compound having at least two active hydrogen atoms such as evidenced by U.S. Patent Nos. 1,922,451, 3,190,927, and 3,346,557.

Representative polyhydroxyl-containing compounds are polyhydroxyl-containing polyesters, polyalkylene polyether polyols, polyhydroxy-terminated polyurethane polymers, polyhydroxyl-containing phosphorus compounds, aliphatic polyols, and alkylene oxide adducts of polyhydric polythioethers, polyacetals, aliphatic thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used.

Any suitable hydroxyl-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethylsuccinic acid, isophthalic acid, terephthalic acid, hemimellitic acid, and 1,4 - cyclohexane-dicarboxylic acid. Any suitable polyhydric alcohol including both aliphatic and aromatic may be used such as ethylene glycol, 1,3 - propylene glycol, 1,2 - propylene glycol, 1,4-butylene glycol, 1,3 - butylene glycol, 1,2 - butylene glycol, 1,5 - pentane diol, 1,4 - pentane diol, 1,3-pentane diol, 1,6 - hexane diol, 1,7-heptane diol, glycerol, 1,1,1-trimethylolpropane, 1,1,1-trimethylolethane, hexane - 1, 2,6 - triol, α-methyl glucoside, pentaerythritol, and sorbitol. Also included with the term "polyhydric alcohol" are compounds derived from phenol such as 2,2-(4,4'-hydroxyphenol)propane, commonly known as Bisphenol A.

Any suitable polyalkylene polyether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymers; epihalohydrins such as epichlorohydrin: as well as aralkylene oxides such as styrene oxide. The polyalkylene polyether polyols may have either primary or secondary hydroxyl groups and, perferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and Encyclopedia of Chemical Technology, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4′-hydroxyphenyl)propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Polyhydroxyl-containing phosphorus compounds which may be used include those compounds disclosed in copending U.S. patent application Ser. No. 728,840 filed May 13, 1968. Preferred polyhydroxyl-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol; 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino aniline, 1,5-diamino naphthalene, and 2,4-diamino toluene; aliphatic amines such as methyl amine, triisopropanol amine, ethylene diamine, 1,3-propylene diamine, 1,4-butylene diamine, and 1,3-butylene diamine.

Other compounds which do not necessarily fit within any of the previously set forth classes of compounds which are quite suitable in the production of isocyanate-terminated prepolymers include the hydroxy-terminated polyurethane prepolymers such as a hydroxy-terminated prepolymer made by reacting an isocyanate with several moles of an alkylene glycol.

The third reactant employed in the preparation of the ester-containing polyols of the present invention is an acid or oxide of phosphorus. Representative acids of phosphorus include those acids having a $P_2O_5$ equivalency of from 72% to 95% such as orthophosphoric acid, phosphoric acid, pyrophosphoric acid, tripolyphosphoric acid, metaphosphoric acid, mixtures of the above acids such as 115% phosphoric acid, phosphorous acid, phosphinic acids such as chloromethyl phosphonic acid, phenyl phosphonic acid, and hydroxymethyl phosphonic acid, phosphonous acid, phosphinic acids such as phenyl phosphinic acid and methyl phosphonic acid and phosphinous acid. Representative oxides of phosphorus include phosphorous pentoxide, diphosphorous trioxide, and aminotri-(methylphosphonic)anhydride.

Another reactant employed in the preparation of the ester-containing polyols is a halogen-containing organic acid anhydride. Typical anhydrides are halogenated polycarboxylic acid anhydrides such as dichloromaleic anhydride,
tetrabromophthalic anhydride,
tetrachlorophthalic anhydride,
1,4,5,6,7,7-hexachlorobicyclo(2.2.1)-5-heptene-2,3-dicarboxylic anhydride, hereinafter called chlorendic anhydride,
1,4,5,6,7,7-hexachloro-2-methylbicyclo(2.2.1)-5-heptene-2,3-dicarboxylic anhydride,
1,4,5,6,7,7-hexachlorobicyclo(2.2.1)-5-heptene-2-acetic-2-carboxylic anhydride
5,6,7,8,9,9-hexachloro-1,2,3,4,4a,5,8,8a-octahydro-5,8-methano-2,3-naphthalene dicarboxylic anhydride, and
1,2,3,4,5,6,7,7-octachloro-3,6-methano-1,2,3,6-tetrahydrophthalic anhydride. Mixtures of any of the above anhydrides may also be employed as well as mixtures of the above anhydrides and nonhalogenated anhydrides such as phthalic anhydride, maleic anhydride, and trimellitic anhydride.

The ester-containing polyols of the present invention are generally prepared by heating the reactants at temperatures between 25° C. and 150° C. preferably between 25° C. to 125° C., for 0.5 to 10 hours. Temperatures below 150° C. must be maintained to prevent the reaction of carboxy and hydroxy groups with the formation of water. The reaction is generally carried out under from 0 to 100 p.s.i.g. Alternatively, the polyhydroxyl-containing compound, the acid or oxide of phosphorus, and the halogen-containing organic acid anhydride may be added to a reaction vessel and maintained at 25° to 150° C. for zero to ten hours. Thereafter, the alkylene oxide is added to the reaction mixture under pressure while maintaining the reaction temperature of between 75° C. and 150° C. Another procedure which may be employed is to add the acid or oxide of phosphorus to the polyhydroxyl-containing compound and thereafter add the anhydride and alkylene oxide. After completion of the reaction, the reaction mixture may be filtered and is stripped of violatiles by heating for about one-half hour to three hours at 80° C. to 110° C. under less than 10 mm. of mercury. If desired, a solvent inert to the reaction may be employed in the preparation of the polyols of the present invention.

The amounts of reactants employed in the preparation of the ester-containing polyols of the present invention may vary. Generally, however, a mole ratio of polyhydroxyl-containing compound to phosphorus compound to halogen-containing acid anhydride of from 1:0.1:0.1 to 1:3:12, preferably from 1:0.3:1 to 1:1:3, will be employed. The amount of alkylene oxide employed will be such to reduce the acid number of the product resulting from the reaction of the anhydride with the phosphorus compound and the polyhydroxyl-containing compound to five or less, preferably one or less. The hydroxyl number of the ester-containing polyol will vary considerably. Generally, however, the polyols will have a hydroxyl number of from about 20 to 600, preferably from about 35 to 400.

In a preferred embodiment of the present invention, the foregoing ester-containing polyols are employed in the preparation of polyurethane compositions, particularly polyurethane foams. The resulting polyurethane products exhibit marked improvements in flame-retardant properties without impairment of the other physical properties of the products. Moreover, the lower viscosity of these polyols enables them to be useful in the preparation of sprayable rigid polyurethane compositions. The polyurethane products are generally prepared by the reaction of the ester-containing polyol with an organic polyisocyanate, optionally in the presence of additional polyhydroxyl-containing components, chain-extending agents, catalysts, surface-active agents, stabilizers, blowing agents, fillers, and pigments. Suitable processes for the preparation of cellular polyurethane plastics are disclosed in U.S. Reissue Patent 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as
m-phenylene diisocyanate,
tolylene-2,4-diisocyanate,
tolylene-2,6-diisocyanate,
mixtures of 2,4- and 2,6-hexamethylene-1,6-diisocyanate,
tetramethylene-1,4-diisocyanate,
cyclohexane-1,4-diisocyanate,
hexahydrotolylene diisocyanate (and isomers),
naphthylene-1,5-diisocyanate,
1-methoxyphenyl-1,2,4-diisocyanate,
diphenylmethane-4,4'-diisocyanate,
4,4'-biphenylene diisocyanate,
3,3'-dimethoxy-4,4'-biphenyl diisocyanate,
3,3'-dimethyl-4,4'-biphenyl diisocyanate, and
3,3'-dimethyldiphenylmethane-4,4'-diisocyanate; the triisocyanates such as 4,4',4''-triphenylmethane triisocyanate, polymethylene polyphenylisocyanate and tolylene 2,4,6-triisocyanate; and the tetraisocyanates such as 4,4'-dimethyldiphenylmethane 2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

As mentioned above, the ester-containing polyol may be employed as the sole polyhydroxyl-containing component or it may be employed along with the polyhydroxyl-containing components commonly employed in the art. Any of the polyhydroxyl-containing components which are described above for use in the preparation of the ester-containing polyols of the present invention may be employed along with the ester-containing polyols in the preparation of the polyurethane compositions of the present invention.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylene diamine 1,4-cyclohexane-bis-(methylamine), ethylene diamine, diethylene triamine, N - (2 - hydroxypropyl)ethylene diamine, N,N'-di(2 - hydroxypropyl)ethylene diamine, piperazine, 2-methylpiperazine, morpholine, and dodecahydro-1,4,7,9b-tetraazaphenalene.

Any suitable catalyst may be used including tertiary amines, such as, for example, triethylene diamine, N-methyl morpholine, N-ethyl morpholine, diethyl ethanolamine, N-coco morpholine, 1-methyl - 4 - dimethylamino ethyl piperazine, 3-methoxy-N-dimethyl propyl amine, N-dimethyl-N'-methyl isopropyl propylene diamine, N,N-diethyl-3-diethyl amino propyl amine, dimethyl benzyl amine, and the like. Other suitable catalysts are, for example, tin compounds such as stannous chloride, tin salts of carboxylic acids, such as dibutyltin di-2-ethyl hexoate, tin alcoholates such as stannous octoate, as well as other organo metallic compounds such as are disclosed in U.S. Patent 2,846,408.

A wetting agent or surface-active agent is generally necessary for production of high grade polyurethane foam according to the present invention, since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

Along with the ester-containing polyols of the present invention, non-reactive flame retardants may be employed in the preparation of the polyurethane compositions of the present invention. Representative flame retardants include tris-2-chloroethylphosphate, tris-2,3-dibromo-propylphosphate, antimony oxide, and polyammonium phosphate.

The following examples illustrate the nature of the invention. All parts are by weight unless otherwise stated.

EXAMPLE 1

A reaction vessel equipped with a thermometer, stirrer, nitrogen source, and heat exchange means was charged with 90 parts of tetrabromophthalic anhydride, 117 parts of an oxypropylated sucrose polyol (hydroxyl number of 560), and 39.9 parts of a phosphate polyol having a hydroxyl number of 425 prepared by the reaction of six moles of propylene oxide with one mole 100% phosphoric acid. While stirring the charge, 13.4 parts of phosphorus pentoxide was added incrementally. Upon completion of the phosphorus pentoxide addition, 72.1 parts of propylene oxide was added to the reaction mixture over a two-hour period with constant stirring at a temperature of 80° C. Upon completion of the oxide addition, the reaction mixture was maintained for one hour at 90° C. The reaction mixture was then stripped for two hours at 80° C. under 2 mm. of mercury. The stripped product had the following properties: hydroxyl number—291; acid number—0.4; 2.7% phosphorus; and 19.7% bromine. A rigid polyurethane foam prepared from this product exhibits flame-retardant properties. Moreover, the product is compatible with polyhydroxyl-containing components commonly employed in the prior art in the preparation of polyurethane foam. Thus, it may be blended with, for example, a polyalkylene ether tetrol (molecular weight of 400) prepared from propylene oxide and pentaerythritol and employed in the preparation of sprayable foamable polyurethane compositions.

EXAMPLE II

A reaction vessel equipped as in Example I was charged with 106 parts of tetrabromophthalic anhydride, 27.5 parts of 115% phosphoric acid, and 140 parts of an oxypropylated sucrose polyol (hydroxyl number of 560). The charge was stirred and heated to 80° C. at which time 90 parts of propylene oxide was added over a four-hour period maintaining the temperature of the reaction mixture between 80° C. and 100° C. Upon completion of the oxide addition, the reaction mixture was stirred at 75° C. for an additional hour. The reaction mixture was then stripped at 80° C. for two hours under less than 5 mm. of mercury. The stripped product had the following properties: hydroxyl number—297; acid number—0.22; 3.2% phosphorus, and 23.7% bromine. A rigid polyurethane foam prepared from this product exhibits flame-retardant properties. Moreover, the product is compatible with polyhydroxyl-containing components commonly employed in the prior art in the preparation of polyurethane foam. Thus, it may be blended with, for example, a polyalkylene ether tetrol (molecular weight of 400) prepared from propylene oxide and pentaerythritol and employed in the preparation of sprayable foamable polyurethane compositions.

EXAMPLE III

A reaction vessel equipped as in Example I was charged with 124 parts of tetrabromophthalic anhydride, 35 parts of 115% phosphoric acid, 56 parts of an oxypropylated sucrose polyol (hydroxyl number of 560), and 84 parts of any oxypropylated ethylene diamine polyol (hydroxyl number of 450). The charge was stirred and heated to 80° C. at which time 123 parts of propylene oxide was added over a six-hour period maintaining the temperature of the reaction mixture between 84° C. and 138° C. Upon completion of the oxide addition, the reaction mixture was stirred at 86° C. for one hour. The reaction mixture was then stripped at 80° C. for two hours under less than 10 mm. of mercury. The stripped product had the following properties: hydroxyl number—270; acid number—4.7; 3.4% phosphorus; and 22.4% bromine.

EXAMPLE IV

A reaction vessel equipped as in Example I was charged with 572 parts of tetrachlorophthalic anhydride, 47.3 parts of phosphorus pentoxide, 1000 parts of polypropylene glycol (hydroxyl number of 110.8), and 2.0 parts of tri-n-butylamine employed as a catalyst. The charge was stirred for two hours over which time the temperature was raised from 25° C. to 75° C. and then 348 parts of propylene oxide was added to the charge over a five-hour period, maintaining the temperature of the reaction mixture at 80° C. The reaction mixture was then stripped for one hour at 80° C. under less than 5 mm. of mercury. The stripped product, a clear yellow liquid, had the following properties: hydroxyl number—60.5; acid number—0.5; 1.1% phosphorus; and 14.8% chlorine. A polyurethane foam was prepared employing 100 parts of a 50/50 weight blend of the above polyol and a 3000 molecular weight polyalkylene ether triol obtained by the condensation of propylene oxide with glycerol, 4 parts of water, 0.3 part of triethylene diamine, 1.5 parts of a silicone surfactant, 0.2 part of stannous octoate, and 48.8 parts of an 80/20 mixture of 2,4-2,6-isomers of toluene diisocyanate. The foam had a good rise time and quick cure time. Moreover, when burned the foam was self-extinguishing and did not drip while burning.

EXAMPLE V

The procedure of Example IV was duplicated with the single exception that 928 parts of tetrabromophthalic anhydride was substituted for the tetrachlorophthalic anhydride. The stripped product had the following properties: hydroxyl number—53.1; acid number—0.2; 1.0% phosphorus; and 26.5% bromine. A polyurethane foam was prepared employing 100 parts of a 50/50 weight blend of the above polyol and a 3000 molecular weight polyalkylene ether triol obtained by the condensation of propylene oxide with glycerol, 4 parts of water, 0.3 part of triethylene diamine, 1.5 parts of a silicone surfactant, 0.2 part of stannous octoate, and 49.4 parts of an 80/20 mixture of 2,4-2,6-isomers of toluene diisocyanate. The foam had a good rise time and quick cure time. Moreover, when burned the foam was self-extinguishing and did not drip while burning.

Two additional products were prepared in the manner described above with the single exception that the amount of phosphorus pentoxide was increased to 95 parts in one run and to 147 parts of the second run. In the first run the product had a hydroxyl number of 52.8, an acid number of 0.6, 1.8% phosphorus, and 26.7% bromine. In the second run the product had a hydroxyl number of 48.8, an acid number of 2.0, 2.67% phosphorus, and 25% bromine. Polyurethane foams prepared as described above exhibited significant flame-retardant properties. Moreover, the products were surprisingly compatible with the conventional components employed in the preparation of polyurethane foams even when used in large amounts.

EXAMPLE VI

A reaction vessel equipped as in Example I was charged with 1000 parts of a polyalkylene ether triol (hydroxyl number of 114) prepared by condensing propylene oxide with glycerine and purged with nitrogen. To the charge, 95 parts of phosphorus pentoxide was then added at 25° C. to 35° C. with good stirring over a two-hour period. The charge was then heated to 70° C. and two parts of tri-n-butylamine was added thereto. After stirring for ten minutes, 928 parts of tetrabromophthalic anhydride was added thereto. Over a five-hour period, 348 parts of propylene oxide was then added to the reaction mixture maintaining the temperature of the mixture between 80° C. and 90° C. After completion of the oxide addition, the reaction mixture was stirred for one hour at 80° C. The reaction mixture was then stripped of volatiles by heating for one hour at 80° C. under a pressure of less than 5 mm. of mercury. The product had the following properties: hydroxyl number—55.7; acid number—0.57; 1.85% phosphorus; and 25.9% bromine. A polyurethane foam was prepared from the above product following the procedure described in the previous example. The foam exhibited flame-retardant properties.

What is claimed is:

1. An ester-containing polyol prepared by the reaction at a temperature of from 25° C. to 150° C. for about 0.5 hour to 10 hours of
    (a) a polyhydroxyl-containing compound with
    (b) an acid or oxide of phosphorus selected from the group consisting of acids of phosphorus having a $P_2O_5$ equivalency of from 72% to 95%, phosphorus pentoxide, diphosphorus trioxide and aminotri-(methylphosphonic) anhydride,
    (c) a halogen-containing organic acid anhydride selected from the group consisting of dichloromaleic anhydride, tetrabromophthalic anhydride, tetrachlorophthalic anhydride, 1,4,5,6,7,7-hexachlorobicyclo (2.2.1)-5-heptene-2,3-dicarboxylic anhydride, 1,4,5,6,7,7 - hexachloro-2-methylbicyclo(2.2.1)-5-heptene-2,3-dicarboxylic anhydride, 1,4,5,6,7,7-hexachlorobicyclo(2.2.1) - 5 - heptene-2-acetic-2-carboxylic anhydride, 5,6,7,8,9,9 - hexachloro-1,2,3,4,4a,5,8,8a-octahydro-5,8-methano-2,3-naphthalene dicarboxylic anhydride, and 1,2,3,4,5,6,7,7-octachloro-3,6-methano-1,3,2,6-tetrahydrophthalic anhydride, and mixtures thereof, and
    (d) an alkylene oxide having from 2 to 12 carbon atoms or a halogenated alkylene oxide having from 2 to 4 carbon atoms, the mole ratio of (a) to (b) to (c) being from 1:0.1:0.1 to 1:3:12 and the amount of said alkylene oxide being such to reduce the acid number of the polyol to five or less.

2. The polyol of claim 1 when the polyhydroxyl-containing compound is a condensate of a polyhydric alcohol and propylene oxide or propylene oxide and ethylene oxide.

3. The polyol of claim 1 when the polyhydroxyl-containing compound is a phosphate polyol prepared from an acid of phosphorus having a $P_2O_5$ equivalency of from 72% to 95%.

4. The polyol of claim 1 when the halogen-containing organic acid anhydride is selected from the group consisting of tetrachlorophthalic anhydride, tetrabromophthalic anhydride, 1,4,5,6,7,7 - hexachlorobicyclo(2.2.1) - 5-heptene-2,3-dicarboxylic anhydride and mixtures thereof.

5. The polyol of claim 1 when the alkylene oxide is propylene oxide.

6. The polyol of claim 1 when the oxide of phosphorus is phosphorus pentoxide.

7. The polyol of claim 1 when the acid of phosphorus is 100% phosphoric acid.

8. A process for the preparation of an ester-containing polyol of claim 1 which comprises reacting at a temperature of from 25° C. to 150° C. for about 0 to 10 hours (a) a polyhydroxyl-containing compound with
(b) an acid or oxide of phosphorus selected from the group consisting of acids of phosphorus having a $P_2O_5$ equivalency of from 72% to 95%, phosphorus pentoxide, diphosphorus trioxide and aminotri-(methylphosphonic) anhydride, and
(c) a halogen-containing organic acid anhydride selected from the group consisting of dichloromaleic anhydride, tetrabromophthalic anhydride, tetrachlorophthalic anhydride, 1,4,5,6,7,7-hexachlorobicyclo (2.2.1)-5-heptene-2,3-dicarboxylic anhydride,1,4,5,6, 7,7 - hexachloro-2-methylbicyclo(2.2.1)-5-heptene-2, 3-dicarboxylic ahydride, 1,4,5,6,7,7-hexachlorobicyclo(2.2.1)-5-heptene-2-acetic-2-carboxylic anhydride, 5,6,7,8,9,9 - hexachloro - 1,2,3,4,4a,5,8,8a-octahydro-5,8-methano-2,3-naphthalene dicarboxylic anhydride, and 1,2,3,4,5,6,7,7 - octachloro-3,6-methano-1,2,3,6-tetrahydrophthalic anhydride, and mixtures thereof, and thereafter adding an alkylene oxide having from 2 to 12 carbon atoms or a halogenated alkylene oxide having from 2 to 4 carbon atoms to the reaction mixture to reduce the acid number of the mixture to less than five.

References Cited
UNITED STATES PATENTS 3,419,642  12/1968  McGary et al. _____ 260—952

CHARLES B. PARKER, Primary Examiner

A. H. SUTTO, Assistant Examiner

U.S. Cl. X.R.

260—2.5 AR, 234 R, 347.8, 943, 944, 948, 950, 951, 978 980